(12) United States Patent
Hiraoka et al.

(10) Patent No.: US 6,417,252 B1
(45) Date of Patent: Jul. 9, 2002

(54) AQUEOUS RESIN COMPOSITION FOR USE AS A SEALER

(75) Inventors: Teruyoshi Hiraoka, 1-1-302, Nakajima 1-chome, Kokura Kita-Ku, Kita-kyushu-shi, Fukuoka; Ryoichi Yoshihara, Himeji, both of (JP)

(73) Assignees: Teruyoshi Hiraoka; Fugilight Industrial Co. Ltd., both of Hyogo (JP)

( * ) Notice: Subject to any disclaimer, the term of this patent is extended or adjusted under 35 U.S.C. 154(b) by 0 days.

(21) Appl. No.: 09/847,396

(22) Filed: May 3, 2001

(30) Foreign Application Priority Data

May 15, 2000 (JP) ........................................ 2000-142104

(51) Int. Cl.[7] ............................ C08K 3/20; C08L 63/02
(52) U.S. Cl. ................... 523/406; 523/409; 523/412; 524/803; 524/832; 524/839
(58) Field of Search ................................. 523/406, 409, 523/412; 524/803, 832, 839

(56) References Cited

U.S. PATENT DOCUMENTS 4,929,668 A * 5/1990 Zeibig ........................ 524/745

* cited by examiner

Primary Examiner—Robert Dawson
Assistant Examiner—D. Aylward
(74) Attorney, Agent, or Firm—Breiner & Breiner, L.L.C.

(57) ABSTRACT

A novel aqueous resin composition for use as a sealer is provided, including an aqueous resin as a major component, and a viscosity modifier adjusting the viscosity of the aqueous resin composition to a value ranging from 5,000 to 100,000 mPa·s, the aqueous resin being an aqueous emulsion polyolefin resin which comprises a polyolefin not containing chlorine as a constituent element while exhibiting a viscosity of 1,000 mPa·s or higher in a water-dispersed state having a solid resin content of 20% to 40% by weight.

20 Claims, No Drawings

AQUEOUS RESIN COMPOSITION FOR USE AS A SEALER

BACKGROUND OF THE INVENTION

1. Field of the Invention

The present invention relates to resin compositions for use in proofing, such as waterproofing, dust-proofing or rust-proofing, of steel plates having metal coating of zinc, aluminum or the like. More specifically, the present invention relates to aqueous resin compositions that are particularly suitable for filling or sealing up a clearance defined in a joint portion of steel plates forming a car body or the like, or as hemming sealers.

2. Description of the Related Art

Steel plates plated with zinc, aluminum or an alloy containing such a metal are used in a great quantity as incorporated in vehicles, building materials, electric household appliances and the like.

Water or dust is likely to collect in a clearance defined in a joint portion of such plated steel plates, or in a bent portion or a like portion of such a plated steel plate, and such collected water or dust causes the steel plates to rust.

In the case of a car body, for instance, a clearance defined in a joint portion of steel plates is filled with a resin composition so-called "body sealer" in order to waterproof or dust-proof the steel plates. Various resin compositions each containing a polyvinyl chloride resin as a major ingredient are widely used as body sealer resin compositions (refer to Japanese Patent Applications No. HEI 4-80382 and No. HEI 7-345483).

Recent environmental issues, however, demand for resins replacing polyvinyl chloride resins containing chlorine or any plasticizer. Further, the recent trend toward improved working environments or the like demands for resin compositions not containing any organic solvent.

Aqueous emulsion type compositions are known as such resin compositions not containing any organic solvent. Most of such aqueous emulsion type resin compositions, however, are used as coated onto paper sheets or films. In this case, the viscosity of such a resin composition in a water-dispersed state is often intentionally lowered to ensure desired coating properties. Such resin compositions thus prepared are in no way suitable as sealers.

A surface-treated steel plate having a superior resistance to white rust has been proposed (refer to Japanese Patent Laid-Open Gazette No. 2000-000519). The surface treatment described in this Gazette comprises coating a steel plate plated with zinc or a zinc alloy or aluminum or an aluminum alloy with a protective film formed from a composition of which major components are a water-dispersible resin and/or a water-soluble resin and a polymer chelating agent having a chelate-forming group bonded to a polymer matrix. The protective film thus formed has a close tissue because the chelate-forming group contained in the protective film is adsorbed by the surface of the plating film.

The aforementioned surface treatment, however, is merely capable of forming a close protective film and hence cannot be expected to rust-proof a portion that is not coated with the film.

It is naturally conceivable to use an aqueous resin composition prepared by dispersing a resin in an aqueous dispersion medium without using any organic solvent as a sealer in attempt to lower the possibility of affecting the environment. Any one of known aqueous resin compositions, however, is not suitable for use as a sealer due to its very low viscosity.

Sealers are required to have a viscosity such as to allow relatively thick coating and good adherence to a subject to be sealed. Aqueous resin compositions, however, inherently have properties opposite to such requirements because they contain water in themselves. Further, where the subject to be sealed is a steel plate, aqueous resin compositions are more disadvantageous in terms of adherence because oil film is usually present on a surface of such a steel plate.

The inventors of the present invention have intensively studied in pursuit of an aqueous resin composition which is improved to overcome the foregoing inconveniences and made the present invention.

Accordingly, it is an object of the present invention to provide an aqueous resin composition for use as a sealer which is suited for waterproofing and rust-proofing of steel plates plated with zinc or a zinc alloy to be used in car bodies, building materials, electric household appliances or the like. The resin composition does not contain chlorine or any organic solvent and hence does not affect the environment while exhibiting a positive rust-proofing capability as well as water-proofing or dust-proofing capability.

SUMMARY OF THE INVENTION

According to the present invention, there is provided an aqueous resin composition for use as a sealer, comprising an aqueous resin as a major component, and a viscosity modifier adjusting the viscosity of the aqueous resin composition to a value ranging from 5,000 to 100,000 mPa·s, the aqueous resin being an aqueous emulsion polyolefin resin which comprises a polyolefin not containing chlorine as a constituent element while exhibiting a viscosity of 1,000 mPa·s or higher in a water-dispersed state having a solid resin content of 20% to 40% by weight.

In the above aqueous resin composition, the aqueous resin as a major component is an aqueous emulsion polyolefin resin which comprises a polyolefin not containing chlorine as a constituent element while exhibiting a viscosity of 1,000 mPa·s or higher in a water-dispersed state having a solid resin content of 20to 40% by weight, and the overall viscosity of the aqueous resin composition is adjusted to a value ranging from 5,000 to 100,000 mPa·s by the viscosity modifier. The composition thus constituted exhibits proper viscosity, heat resistance, durability and strength as a sealer. Further, since the composition does not contain chlorine or any organic solvent, it does not emit any harmful substance during preparation, coating and disposal thereof or on other occasions and hence will not raise any environmental pollution problem or like problems.

The aqueous resin composition for use as a sealer may further comprise a water-soluble magnesium compound in a proportion of 0.1% to 10% by weight.

When the water-soluble magnesium compound is added to the foregoing aqueous resin composition, the resulting composition has an advantage of remarkably rust-proofing a steel plate plated with zinc or a zinc alloy as well as the advantages described above.

These and other objects, features and attendant advantages of the present invention will become apparent from the reading of the following detailed description.

DETAILED DESCRIPTION OF THE PREFERRED EMBODIMENTS

The present invention will now be described in detail.

The viscosity of the aqueous resin composition according to the present invention is adjusted to a value ranging from 5,000 to 100,000 mPa·s. If the viscosity of the composition is higher than 100,000 mPa·s, the coating property of the composition is unsatisfactory. If, on the other hand, the viscosity of the composition is lower than 5,000 mPa·s, the composition, if applied to a steel plate surface stained with oil, may flow down without fixing to a desired portion of the steel plate.

The aqueous emulsion polyolefin resin used as a major component in the aqueous resin composition of the present invention is preferably a dispersion of a particulate polyolefin having a particle diameter of several $\mu$m in water.

The aqueous emulsion polyolefin resin exhibits a viscosity of 1,000 mPa·s or higher at normal temperature when the solid resin content thereof is 20% to 40% by weight. If the solid resin content is less than 20% by weight, the aqueous resin composition has a viscosity lower than the predetermined value and hence cannot serve as a sealer for sealing up a clearance defined, for example, in a joint portion of steel plates or in a bent portion of a steel plate. If the solid resin content is more than 40% by weight, the aqueous resin composition undesirably exhibits too high a viscosity to ensure a satisfactory coating property.

Though a viscosity of about 10,000 mPa·s is practical as the viscosity of the aqueous emulsion polyolefin resin, there is no particular upper limit of the viscosity.

Further, the aqueous emulsion polyolefin resin does not contain chlorine as a constituent element thereof.

Examples of polyolefin resins for use in the aqueous emulsion polyolefin resin include typical vinyl acetate polyolefins or their copolymers with other monomers, ionomers, and modified ionomers. Any appropriate one of these resins is selected according to the viscosity or adhesive property varying within the aforementioned range depending upon applications.

Examples of such aqueous emulsion polyolefin resins having a solid resin content and a viscosity within respective ranges specified above include commercially available products of MITSUI KAGAKU CO., LTD. in the name of "CHEMIPEARL S100" and "CHEMIPEARL V200", both of which are registered trademarks. There is, however, no particular limitation to these products.

Usable as the viscosity modifier in the present invention is any appropriate inorganic filler or any appropriate organic thickening agent, or a mixture thereof.

As a matter of course, inorganic fillers for use in the present invention do not contain chlorine as a constituent element thereof. Examples of suitable inorganic fillers are inorganic compounds generally used in sealers, such as calcium carbonate, calcium silicate, bentonite, zeolite, talc, glass bead, and surface-modified titania; powdery metals; and fillers treated with organic substances. Any appropriate one of these inorganic fillers is selected according to the desired purposed. Among them, modified calcium carbonate and modified titania are preferable but there is no particular limitation thereto.

Some care should be taken in handling an inorganic filler in a fine powdery state or having a strong basicity because they may vigorously react with the resin or the water-soluble magnesium compound to be described later.

As a matter of course, organic thickening agents for use in the present invention do not contain chlorine as a constituent element thereof. Examples of preferable thickening agents are those generally known as thickening agents, such as polyethylene glycol (PEG), carboxymethylcellulose (CMC), hydroxymethylcellulose (HMC), cellulose powder, and sodium alginate. There is, however, no particular limitation to these thickening agents.

Addition of a water-soluble magnesium compound to the aqueous resin composition is preferable because it enhances the rust-proofing or corrosion-proofing action of the composition on steel plates plated with zinc or a zinc alloy and the like.

The water-soluble magnesium compound is used in an amount ranging between 0.1% by weight and 10% by weight. If the amount of the magnesium compound is less than 0.1% by weight, a desired corrosion-proofing action will not result. Addition of more than 10% by weight of the magnesium compound is not preferable because the corrosion-proofing action is not improved more than a certain level and, hence, an excess of the magnesium compound is wasteful and because the strength of the resin and the stability of the aqueous resin composition become lowered.

Examples of useful water-soluble magnesium compounds include magnesium carbonate, magnesium phosphate, and magnesium dihydrogen phosphate. Though these magnesium compounds are preferable in terms of their superior corrosion resistance and water-solubility, there is no particular limitation to these compounds.

In order to improve the properties of the aqueous resin composition, for example, the adherence to a steel plate, an aqueous adherent resin may be added to the aqueous resin forming the major component. In this case, the aqueous adherent resin is added so as not to vary the solids content of all the aqueous resins used in the composition. In other words, the aqueous adherent resin is added so that the total solids content of the aqueous adherent resin and the aqueous emulsion polyolefin resin is equal to the solids content of the aqueous resin used in the composition of the present invention.

Examples of such aqueous adherent resins include an aqueous urethane resin, an aqueous epoxy resin, and a mixture of these resins.

The term "aqueous urethane resin" used herein is a general term which is meant to include aqueous dispersions of reaction products of polyisocyanate and active hydrogen containing compounds such as polyol. Examples of typical aqueous urethane resins include anion-type aqueous urethane resins prepared by addition of polyhydroxycarboxylic acid or amino sulfonate to isocyanate group, cation-type aqueous urethane resins, and nonion-type aqueous urethane resins. Thes e aqueous urethane resins may be emulsified or modified with acrylic, epoxy or alkyd resins.

Typical aqueous epoxy resins include those rendered water-soluble by introduction of carboxyl group, which may be further rendered highly functional by bonding an acrylic resin thereto.

Where the aqueous urethane resin or the aqueous epoxy resin is added alone, each of these resins is blended at a ratio (solids content ratio) of 30% to 70% by weight relative to 30% to 70% by weight of the aqueous emulsion polyolefin resin.

Where the aqueous urethane resin and the aqueous epoxy resin are added as a mixture, the mixing ratio (weight ratio) of the aqueous urethane resin to the aqueous epoxy resin ranges between 1:4 and 4:1.

If the proportion of the aqueous adherent resin in the mixture of the resins is less than 30% by weight, the resulting aqueous resin composition does not exhibit a satisfactory adherence. The aqueous adherent resin proportion of more than 70% by weight in the mixture of the resins is not preferable in terms of the resilience and impact resistance of the resulting resin composition.

The aqueous resin composition for use as a sealer according to the present invention may further comprise any one of appropriate known additives such as pigment, antioxidant, antifungal agent, mildewproofing agent, anti-foaming agent, and like additives.

EXAMPLES

The present invention will hereinafter be described in more detail by way of examples, which are, in no way, construed as limitative of the present invention.

First, Examples 1 to 9 each incorporated with an inorganic filler and free of any water-soluble magnesium compound are described below together with a Comparative Example.

Example 1

An aqueous resin A consisting of an aqueous emulsion polyolefin resin having a solid resin content of 25% and a viscosity of 3,000 to 5,000 mPa·s ("CHEMIPEARL S100" ionomer type produced by MITSUI KAGAKU KABUSHIKIKAISHA), and an inorganic filler consisting of modified calcium carbonate (produced by SHIRAISHI KOGYO KABUSHIKIKAISHA), which will be called "calcium carbonate" simply, were mixed together in solids content proportions of 70 wt % and 30 wt %, respectively, to obtain an aqueous resin composition (No. 1) having an overall viscosity adjusted to about 6,000 mPa·s for use as a sealer according to the present invention.

Example 2

An aqueous resin B consisting of an aqueous emulsion polyolefin resin having a solid resin content of 25% and a viscosity of 8,000 to 12,000 mPa·s ("CHEMIPEARL V200" vinyl acetate copolymer type produced by MITSUI KAGAKU KABUSHIKIKAISHA), calcium carbonate as an inorganic filler, and titanium white as a pigment, were mixed together in solids content proportions of 60 wt %, 39 wt % and 1 wt %, respectively, to obtain an aqueous resin composition (No. 2) having an overall viscosity adjusted to about 7,000 mPa·s for use as a sealer according to the present invention.

Example 3

The aqueous resin A, calcium carbonate as an inorganic filler, and an adherence imparting component U consisting of an aqueous urethane resin ("ADEQUABONDETIGHTER HUX-290H" produced by ASAHIDENKAKOGYO KABUSHIKIKAISHA), were mixed together in solids content proportions of 40 wt %, 30 wt % and 30 wt %, respectively, to obtain an aqueous resin composition (No. 3) having an overall viscosity adjusted to about 7,000 mPa·s for use as a sealer according to the present invention.

Example 4

The aqueous resin B, calcium carbonate as an inorganic filler, the adherence imparting component U, and titanium white as a pigment were mixed together in solids content proportions of 30 wt %, 39 wt %, 30 wt % and 1 wt %, respectively, to obtain an aqueous resin composition (No. 4) having an overall viscosity adjusted to about 8,000 mPa·s for use as a sealer according to the present invention.

Example 5

The aqueous resin A, calcium carbonate as an inorganic filler, and an adherence imparting component E consisting of an aqueous epoxy resin ("T-152W" produced by DAINIPPON INKI KABUSHIKIKAISHA), were mixed together in solids content proportions of 40 wt %, 30 wt % and 30 wt %, respectively, to obtain an aqueous resin composition (No. 5) having an overall viscosity adjusted to about 8,000 mPa·s for use as a sealer according to the present invention.

Example 6

The aqueous resin B, calcium carbonate as an inorganic filler, the adherence imparting component E, and titanium white as a pigment were mixed together in solids content proportions of 30 wt %, 39 wt %, 30 wt % and 1 wt %, respectively, to obtain an aqueous resin composition (No. 6) having an overall viscosity adjusted to about 10,000 mPa·s for use as a sealer according to the present invention.

Example 7

The aqueous resin A, calcium carbonate as an inorganic filler, the adherence imparting component U, and the adherence imparting component E were mixed together in solids content proportions of 40 wt %, 30 wt %, 15 wt % and 15 wt %, respectively, to obtain an aqueous resin composition (No. 7) having an overall viscosity adjusted to about 11,000 mPa·s for use as a sealer according to the present invention.

Example 8

The aqueous resin B, calcium carbonate as an inorganic filler, the adherence imparting component U, the adherence imparting component E, and titanium white as a pigment were mixed together in solids content proportions of 30 wt %, 39 wt %, 15 wt %, 15 wt % and 1 wt %, respectively, to obtain an aqueous resin composition (No. 8) having an overall viscosity adjusted to about 14,000 mPa·s for use as a sealer according to the present invention.

Example 9

The aqueous resin A, and surface-modified titania ("TYPURE R900" produced by DUPONT CO.) as an inorganic filler were mixed together in solids content proportions of 60 wt % and 40 wt %, respectively, to obtain an aqueous resin composition (No. 9) having an overall viscosity adjusted to about 8,000 mPa·s for use as a sealer according to the present invention.

Comparative Example 1

A polyvinyl chloride resin in an amount of 35 wt %, calcium carbonate in an amount of 30 wt % as an inorganic filler, an isocyanate resin (containing an organic solvent) in an amount of 5 wt % for imparting adherence, and a plasticizer in an amount of 30 wt %, were mixed together, to obtain a conventional resin composition for use as a sealer.

The aqueous resin compositions obtained in Examples 1 to 9 and the conventional aqueous resin composition obtained in Comparative Example 1 were tested for their coating property and adherence. The results of the test are shown in Table 1.

TABLE 1

|  | Ex. 1 | Ex. 2 | Ex. 3 | Ex. 4 | Ex. 5 | Ex. 6 | Ex. 7 | Ex. 8 | Ex. 9 | Comp. Ex. 1 |
|---|---|---|---|---|---|---|---|---|---|---|
| Aqueous resin | A [70] | B [60] | A [40] | B [30] | A [40] | B [30] | A [40] | B [30] | A [60] | Vinyl chloride |
| Inorganic Filler | Calcium carbonate [30] | Calcium carbonate [39] | Calcium carbonate [30] | Calcium carbonate [39] | Calcium carbonate [30] | Calcium carbonate [39] | Calcium carbonate [30] | Calcium carbonate [39] | Surface-modified titania [40] | Calcium carbonate [30] |
| Adherence imparting component | — | — | U [30] | U [30] | E [30] | E [30] | U + E [15] + [15] | U + E [15] + [15] | — | Isocyanate resin [5] |
| Pigment | — | Titanium white [1] | — | Titanium white [1] | — | Titanium white [1] | — | Titanium white [1] | — | — |
| Other additive | | | | | | | | | | Plasticizer |
| Viscosity mPa·s | 6,000 | 7,000 | 7,000 | 8,000 | 8,000 | 10,000 | 11,000 | 14,000 | 8,000 | |
| Coating Property | ○ | ○ | ○ | ○ | ○ | ○ | ○ | ○ | ○ | Δ–○ |
| Adherence | ○ | ○ | ⊚ | ⊚ | ⊚ | ⊚ | ⊚ | ⊚ | ○ | ○–⊚ |
| Note | | | | | | | | | | inferior adaptability to environment |

Remarks: Numeral in [ ] represents a solid content in wt %.

Evaluation of coating property in Table 1 was carried out as follows. Steel plates surface-treated by cation electrodeposition coating (zinc electroplating, zinc hot dip galvanizing, zinc alloy plating or like plating) employed in car coating were each coated with each of the resin compositions (Nos. 1 to 9) to a thickness of 1 mm. Each coating thus formed was preheated at 100° C. and then finally heated at 140° C. for 30 minutes. The outward appearance of each coating was evaluated by observation according to the following rating: a coating having a brilliance was rated into category "○"; a coating with no brilliance was rated into category "Δ"; and a coating with partial runaway was rated into category "X".

Evaluation of adherence was carried out as follows. The coating on each steel plate used in the evaluation of coating property was measured for its adhesion strength according to the test method prescribed by Japan Automobile Standards Organization (hereinafter referred to as "JASO" simply) M-323-77. The results of the test were evaluated according to the following rating: a coating having an adhesion strength of 15 kg/cm$^2$ was rated into category "⊚"; a coating having an adhesion strength of 10 to 15 kg/cm$^2$ was rated into category "○"; and a coating having an adhesion strength lower than 10 kg/cm$^2$ or with an interface break was rated "X".

As seen from Table 1, the aqueous resin compositions (Nos. 1 to 9) according to the present invention each exhibited coating property and adherence comparable to or higher than the conventional resin composition for use as a sealer (Comparative Example 1) containing a vinyl chloride resin as a major component.

Besides, the compositions according to the present invention did not contain chlorine or any organic solvent and hence had a minimized possibility of affecting the environment, which is incomparably lower than that of the conventional resin composition (Comparative Example 1).

Examples 10 to 22 to be described below were not incorporated with any water-soluble magnesium compound but admixed with an organic thickening agent or a mixture of an inorganic filler and the organic thickening agent.

Example 10

The aqueous resin A, and polyethylene glycol (hereinafter referred to as "PEG" simply) having an average molecular weight of about 20,000 as an organic thickening agent were mixed together in solids content proportions of 90 wt % and 10 wt %, respectively, to obtain an aqueous resin composition (No. 10) having an overall viscosity adjusted to about 12,000 mPa·s for use as a sealer according to the present invention.

Example 11

The aqueous resin A, and carboxymethylcellulose (hereinafter referred to as "CMC" simply) as a thickening agent were mixed together in solids content proportions of 95 wt % and 5 wt %, respectively, to obtain an aqueous resin composition (No. 11) having an overall viscosity adjusted to about 10,000 mPa·s for use as a sealer according to the present invention.

Example 12

The aqueous resin A, and hydroxymethylcellulose (hereinafter referred to as "HMC" simply) as an organic thickening agent were mixed together in solids content proportions of 96 wt % and 4 wt %, respectively, to obtain an aqueous resin composition (No. 12) having an overall viscosity adjusted to about 18,000 mPa·s for use as a sealer according to the present invention.

Example 13

The aqueous resin A, PEG, and the adherence imparting component U were mixed together in solids content proportions of 45 wt %, 10 wt % and 45 wt %, respectively, to obtain an aqueous resin composition (No. 13) having an overall viscosity adjusted to about 13,000 mPa·s for use as a sealer according to the present invention.

Example 14

The aqueous resin A, CMC, and the adherence imparting component U were mixed together in solids content proportions of 45 wt %, 10 wt % and 45 wt %, respectively, to obtain an aqueous resin composition (No. 14) having an overall viscosity adjusted to about 12,000 mPa·s for use as a sealer according to the present invention.

Example 15

The aqueous resin A, HMC, and the adherence imparting component U were mixed together in solids content proportions of 50 wt %, 2 wt % and 48 wt %, respectively, to obtain an aqueous resin composition (No. 15) having an overall viscosity adjusted to about 16,000 mPa·s for use as a sealer according to the present invention.

Example 16

The aqueous resin B, PEG, and titanium white as a pigment were mixed together in solids content proportions of 89 wt %, 10 wt % and 1 wt %, respectively, to obtain an aqueous resin composition (No. 16) having an overall viscosity adjusted to about 13,000 mPa·s for use as a sealer according to the present invention.

Example 17

The aqueous resin B, PEG, and the adherence imparting component U were mixed together in solids content proportions of 45 wt %, 10 wt % and 45 wt %, respectively, to obtain an aqueous resin composition (No. 17) having an overall viscosity adjusted to about 16,000 mPa·s for use as a sealer according to the present invention.

Example 18

The aqueous resin B, PEG, the adherence imparting component U, and calcium carbonate as an inorganic filler were mixed together in solids content proportions of 30 wt %, 10 wt %, 30 wt % and 30 wt %, respectively, to obtain an aqueous resin composition (No. 18) having an overall viscosity adjusted to about 20,000 mPa·s for use as a sealer according to the present invention.

Example 19

The aqueous resin A, HMC, and the adherence imparting component E were mixed together in solids content proportions of 60 wt %, 2 wt % and 38 wt %, respectively, to obtain an aqueous resin composition (No. 19) having an overall viscosity adjusted to about 20,000 mPa·s for use as a sealer according to the present invention.

Example 20

The aqueous resin B, HMC, the adherence imparting component E, and calcium carbonate were mixed together in solids content proportions of 34 wt %, 2 wt %, 34 wt % and 30 wt %, respectively, to obtain an aqueous resin composition (No. 20) having an overall viscosity adjusted to about 26,000 mPa·s for use as a sealer according to the present invention.

Example 21

The aqueous resin A, PEG, the adherence imparting component U, and the adherence imparting component E were mixed together in solids content proportions of 40 wt %, 10 wt %, 25 wt % and 25 wt %, respectively, to obtain an aqueous resin composition (No. 21) having an overall viscosity adjusted to about 16,000 mPa·s for use as a sealer according to the present invention.

Example 22

The aqueous resin B, PEG, the adherence imparting component U, the adherence imparting component E, and titania oxide as an inorganic filler were mixed together in solids content proportions of 30 wt %, 10 wt %, 15 wt %, 15 wt % and 30 wt %, respectively, to obtain an aqueous resin composition (No. 22) having an overall viscosity adjusted to about 19,000 mPa·s for use as a sealer according to the present invention.

Examples 10 to 22 described above were tested and evaluated in the same manner as were Examples 1 to 9. The results obtained are shown in Table 2.

TABLE 2

| | EX. 10 | EX. 11 | EX. 12 | EX. 13 | EX. 14 | EX. 15 | EX. 16 | EX. 17 | EX. 18 | EX. 19 | EX. 20 | EX. 21 | EX. 22 |
|---|---|---|---|---|---|---|---|---|---|---|---|---|---|
| Aqueous resin | A [90] | A [95] | A [96] | A [45] | A [45] | A [2] | B [89] | B [45] | B [30] | A [60] | B [34] | A [40] | B [30] |
| Organic filler | PEG [10] | CMC [5] | HMC [4] | PEG [10] | CMC [10] | HMC [2] | PEG [10] | PEG [10] | PEG [10] | HMC [2] | HMC [2] | PEG [10] | PEG [10] |
| Adherence imparting component | — | — | — | U [45] | U [45] | U [48] | — | U [45] | U [30] | E [38] | E [34] | U + E [25] + [25] | U + E [15] + [15] |
| Pigment or Inorganic filler | — | — | — | — | — | — | Titanium White [1] | — | Calcium carbonate [30] | — | Calcium carbonate [30] | — | Surface-modified titania [30] |
| Viscosity mPa · s | 12,000 | 10,000 | 18,000 | 13,000 | 12,000 | 16,000 | 13,000 | 16,000 | 20,000 | 20,000 | 26,000 | 16,000 | 19,000 |
| Coating property | ○ | ○ | ○ | ○ | ○ | ○ | ○ | ○ | ○ | ○ | ○ | ○ | ○ |
| Adherence | ○ | ○ | ○ | ◎ | ◎ | ◎ | ○ | ◎ | ◎ | ◎ | ◎ | ◎ | ◎ |

Remarks: Numeral in [ ] represents a solid content in wt %.

As seen from Table 2, the aqueous resin compositions (Nos. 10 to 22) according to the present invention, like the foregoing aqueous resin compositions (Nos. 1 to 9), each exhibited coating property and adherence comparable to or higher than the conventional resin composition for use as a sealer (Comparative Example 1) containing a vinyl chloride resin as a major component. Besides, the compositions according to the present invention did not contain chlorine or any organic solvent and hence had a minimized possibility of affecting the environment, which is incomparably lower than that of the conventional resin composition (Comparative Example 1).

Examples 23 to 31 each incorporated with a water-soluble magnesium compound and admixed with an inorganic filler are described below together with Comparative Example 2.

Example 23

The aqueous resin A, calcium carbonate, and magnesium dihydrogen phosphate ($Mg(H_2PO_4)_2$) as a corrosion resistance imparting agent were mixed together in solids content proportions of 70 wt %, 25 wt % and 5 wt %, respectively, to obtain an aqueous resin composition (No. 23) having an overall viscosity adjusted to about 8,000 mPa·s for use as a sealer according to the present invention.

Example 24

The aqueous resin B, calcium carbonate, titanium white as a pigment, and magnesium dihydrogen phosphate were mixed together in solids content proportions of 60 wt %, 29 wt %, 1 wt % and 10 wt %, respectively, to obtain an aqueous resin composition (No. 24) having an overall viscosity adjusted to about 11,000 mPa·s for use as a sealer according to the present invention.

Example 25

The aqueous resin A, calcium carbonate, the adherence imparting component U, and magnesium dihydrogen phosphate were mixed together in solids content proportions of 40 wt %, 25 wt %, 30 wt % and 5 wt %, respectively, to obtain an aqueous resin composition (No. 25) having an overall viscosity adjusted to about 9,000 mPa·s for use as a sealer according to the present invention.

Example 26

The aqueous resin B, calcium carbonate, the adherence imparting component U, titanium white as a pigment, and magnesium dihydrogen phosphate were mixed together in solids content proportions of 30 wt %, 29 wt %, 30 wt %, 1 wt % and 10 wt %, respectively, to obtain an aqueous resin composition (No. 26) having an overall viscosity adjusted to about 13,000 mPa·s for use as a sealer according to the present invention.

Example 27

The aqueous resin A, calcium carbonate, the adherence imparting component E, and magnesium dihydrogen phosphate were mixed together in solids content proportions of 40 wt %, 25 wt %, 30 wt % and 5 wt %, respectively, to obtain an aqueous resin composition (No. 27) having an overall viscosity adjusted to about 10,000 mPa·s for use as a sealer according to the present invention.

Example 28

The aqueous resin B, calcium carbonate, the adherence imparting component E, titanium white, and magnesium dihydrogen phosphate were mixed together in solids content proportions of 30 wt %, 29 wt %, 30 wt %, 1 wt % and 10 wt %, respectively, to obtain an aqueous resin composition (No. 28) having an overall viscosity adjusted to about 15,000 mPa·s for use as a sealer according to the present invention.

Example 29

The aqueous resin A, calcium carbonate, the adherence imparting component U, the adherence imparting component E, and magnesium dihydrogen phosphate were mixed together in solids content proportions of 40 wt %, 25 wt %, 15 wt %, 15 wt % and 5 wt %, respectively, to obtain an aqueous resin composition (No. 29) having an overall viscosity adjusted to about 11,000 mPa·s for use as a sealer according to the present invention.

Example 30

The aqueous resin B, calcium carbonate, the adherence imparting component U, the adherence imparting component E, titanium white, and magnesium dihydrogen phosphate were mixed together in solids content proportions of 30 wt %, 29 wt %, 15 wt %, 15 wt %, 1 wt % and 10 wt %, respectively, to obtain an aqueous resin composition (No. 30) having an overall viscosity adjusted to about 14,000 mPa·s for use as a sealer according to the present invention.

Example 31

The aqueous resin A, calcium carbonate, the adherence imparting component U, and magnesium dihydrogen phosphate were mixed together in solids content proportions of 35 wt %, 30 wt %, 34 wt % and 1 wt %, respectively, to obtain an aqueous resin composition (No. 31) having an overall viscosity adjusted to about 8,000 mPa·s for use as a sealer according to the present invention.

Comparative Example 2

The aqueous resin A, calcium carbonate as a filler, and the adherence imparting component U are mixed together in solids content proportions of 40 wt %, 30 wt % and 30 wt %, respectively, to obtain a resin composition for use as a sealer.

The aqueous resin compositions obtained in Examples 23 to 31 and the aqueous resin composition obtained in Comparative Example 2 were tested for their coating property and adherence. The results of the test are shown in Table 3.

TABLE 3

| | Ex. 23 | Ex. 24 | Ex. 25 | Ex. 26 | Ex. 27 | Ex. 28 | Ex. 29 | Ex. 30 | Ex. 31 | Comp. Ex. 2 |
|---|---|---|---|---|---|---|---|---|---|---|
| Aqueous resin | A [70] | B [60] | A [40] | B [30] | A [40] | B [30] | A [40] | B [30] | A [35] | A [40] |
| Inorganic filler | Calcium carbonate [25] | Calcium carbonate [29] | Calcium carbonate [25] | Calcium Carbonate [29] | Calcium carbonate [25] | Calcium carbonate [29] | Calcium carbonate [25] | Calcium carbonate [29] | Calcium carbonate [30] | Calcium carbonate [30] |
| Adherence imparting component | — | — | U [30] | U [30] | E [30] | E [30] | U + E [15] + [15] | U+E [15] + [15] | U [34] | U [30] |
| Pigment | — | Titanium White [1] | — | Titanium White [1] | — | Titanium White [1] | — | Titanium White [1] | — | — |
| Corrosion | Magnesium | Magnesium | Magnesium | Magnesium | Magnesium | Magnesium | Magnesium | Magnesium | Magnesium | — |

TABLE 3-continued

|  | Ex. 23 | Ex. 24 | Ex. 25 | Ex. 26 | Ex. 27 | Ex. 28 | Ex. 29 | Ex. 30 | Ex. 31 | Comp. Ex. 2 |
|---|---|---|---|---|---|---|---|---|---|---|
| resistance imparting agent | dihydrogen phosphate [5] | dihydrogen phosphate [10] | dihydrogen phosphate [5] | dihydrogen phosphate [10] | dihydrogen phosphate [5] | dihydrogen phosphate [10] | dihydrogen phosphate [5] | dihydrogen phosphate [10] | dihydrogen phosphate [1] | |
| viscosity mPa · s | 8,000 | 11,000 | 9,000 | 13,000 | 10,000 | 15,000 | 11,000 | 14,000 | 8,000 | |
| Coating property | ○ | ○ | ○ | ○ | ○ | ○ | ○ | ○ | ○ | ○ |
| Adherence | ○ | ○ | ⊚ | ⊚ | ⊚ | ⊚ | ⊚ | ⊚ | ⊚ | ⊚ |
| Corrosion resistance | ⊚ | ⊚ | ⊚ | ⊚ | ⊚ | ⊚ | ⊚ | ⊚ | ⊚ | X |

Remarks: Numeral in [ ] represents a solid content in wt %.

Evaluation of coating property in Table 3 was carried out as follows. Steel plates surface-treated by cation electrodeposition coating (zinc electroplating, zinc hot dip galvanizing, zinc alloy plating or like plating) employed in car coating were each coated with each of the aqueous resin compositions (Nos. 23 to 31) to a thickness of 1 mm. Each coating thus formed was preheated at 100° C. and then finally heated at 140° C. for 30 minutes. The outward appearance of each coating was evaluated by observation according to the following rating: a coating having a brilliance was rated into category "○"; a coating with no brilliance was rated into category "Δ"; and a coating with partial runaway was rated into category "X".

Evaluation of adherence was carried out as follows. The coating on each steel plate used in the evaluation of coating property was measured for its adhesion strength according to the test method prescribed by JASO M-306-88. The results of the test were evaluated according to the following rating: a coating having an adhesion strength of 15 kg/cm$^2$ was rated into category "⊚"; a coating having an adhesion strength of 10 to 15 kg/cm$^2$ was rated into category "○"; and a coating having an adhesion strength lower than 10 kg/cm$^2$ or with an interface break was rated into category "X".

Evaluation of corrosion resistance was carried out as follows. Each steel plate electroplated with zinc used in the evaluation of coating property, which was coated with each aqueous resin composition, was tested according to the salt spray test method prescribed by JIS C-0023. The outward appearance of each steel plate 500 hours after the starting of the salt spray test was evaluated according to the following rating: a steel plate with little change was rated into category "⊚"; a steel plate with no rust produced but white rust was rated into category "○"; and a steel plate with rust produced was rated into category "X".

As seen from Table 3, the aqueous resin compositions (Nos. 23 to 31) according to the present invention each exhibited coating property and adherence comparable to or higher than the resin composition for use as a sealer (Comparative Example 1).

Further, the compositions according to the present invention were highly excellent in corrosion resistance as compared with the resin composition (Comparative Example 2) not containing any water-soluble magnesium.

Examples 32 to 39 to be described below were each incorporated with a water-soluble magnesium compound and admixed with an organic thickening agent or a mixture of an inorganic filler and the organic thickening agent.

Example 32

The aqueous resin A, PEG, and magnesium dihydrogen phosphate were mixed together in solids content proportions of 85 wt %, 10 wt % and 5 wt %, respectively, to obtain an aqueous resin composition (No. 32) having an overall viscosity of about 15,000 mPa·s for use as a sealer according to the present invention.

Example 33

The aqueous resin B, PEG, and magnesium dihydrogen phosphate were mixed together in solids content proportions of 80 wt %, 10 wt % and 10 wt %, respectively, to obtain an aqueous resin composition (No. 33) having an overall viscosity of about 18,000 mPa·s for use as a sealer according to the present invention.

Example 34

The aqueous resin A, PEG, the adherence imparting component U, and magnesium dihydrogen phosphate were mixed together in solids content proportions of 40 wt %, 10 wt %, 45 wt % and 5 wt %, respectively, to obtain an aqueous resin composition (No. 34) having an overall viscosity of about 16,000 mPa·s for use as a sealer according to the present invention.

Example 35

The aqueous resin B, HCM, the adherence imparting component U, and magnesium dihydrogen phosphate were mixed together in solids content proportions of 50 wt %, 4 wt %, 36 wt % and 10 wt %, respectively, to obtain an aqueous resin composition (No. 35) having an overall viscosity of about 23,000 mPa·s for use as a sealer according to the present invention.

Example 36

The aqueous resin A, PEG, the adherence imparting component E, and magnesium dihydrogen phosphate were mixed together in solids content proportions of 45 wt %, 10 wt %, 40 wt % and 5 wt %, respectively, to obtain an aqueous resin composition (No. 36) having an overall viscosity of about 24,000 mPa·s for use as a sealer according to the present invention.

Example 37

The aqueous resin B, HMC, the adherence imparting component E, the surface-modified titania, and magnesium dihydrogen phosphate were mixed together in solids content proportions of 30 wt %, 4 wt %, 26 wt %, 30 wt % and 10 wt %, respectively, to obtain an aqueous resin composition (No. 37) having an overall viscosity of about 29,000 mPa·s for use as a sealer according to the present invention.

Example 38

The aqueous resin A, CMC, the adherence imparting component U, the adherence imparting component E, and magnesium dihydrogen phosphate were mixed together in solids content proportions of 60 wt %, 5 wt %, 15 wt %, 15 wt % and 5 wt %, respectively, to obtain an aqueous resin composition (No. 38) having an overall viscosity of about 20,000 mPa·s for use as a sealer according to the present invention.

Example 39

The aqueous resin B, PEG, the adherence imparting component U, the adherence imparting component E, titanium white, and magnesium dihydrogen phosphate were mixed together in solids content proportions of 49 wt %, 10 wt %, 15 wt %, 15 wt %, 1 wt % and 10 wt %, respectively, to obtain an aqueous resin composition (No. 39) having an overall viscosity of about 25,000 mPa·s for use as a sealer according to the present invention.

Examples 32 to 39 described above were tested and evaluated in the same manner as were Examples 23 to 31. The results obtained are shown in Table 4.

subjected to the salt spray test for 192 hours continuously and thereafter observed as to whether white rust or rust was produced or not and whether a blister or a like inconvenience occurred at the scratched portion and the border of the coating.

As a result, the portion coated with the aqueous resin composition of the present invention was observed to be free from rust or white rust, and from any blister. In the scratched portion, no rust was produced though some white rust was observed.

Similarly, no rust was produced rust though some white rust was observed at the border of the coating.

It can be understood from the results of the test that the aqueous resin composition containing even a slight amount (as small as 1 wt %) of the water-soluble magnesium compound is capable of exhibiting a remarkable rust-proofing effect, which covers even the border of the coating. Thus, the aqueous resin composition is capable of proofing corrosion from the border of a portion coated with this composition and preventing the sealer from exfoliating.

TABLE 4

|  | Ex. 32 | Ex. 33 | Ex. 34 | Ex. 35 | Ex. 36 | Ex. 37 | Ex. 38 | Ex. 39 |
|---|---|---|---|---|---|---|---|---|
| Aqueous resin | A [85] | B [80] | A [40] | B [50] | A [45] | B [30] | A [60] | B [49] |
| Organic filler | PEG [10] | PEG [10] | PEG [10] | HMC [4] | PEG [10] | HMC [4] | CMC [5] | PEG [10] |
| Adherence imparting component | — | — | U [45] | U [36] | E [40] | E [26] | U + E [15] + [15] | U + E [15] + [15] |
| Inorganic filler or Pigment | — | — | — | — | — | Surface-treated titania [30] | — | Titanium white [1] |
| Corrosion resistance imparting agent | Magnesium dihydrogen phosphate [5] | Magnesium dihydrogen phosphate [10] | Magnesium dihydrogen phosphate [5] | Magnesium dihydrogen phosphate [10] | Magnesium dihydrogen phosphate [5] | Magnesium dihydrogen phosphate [10] | Magnesium dihydrogen phosphate [5] | Magnesium dihydrogen phosphate [10] |
| Viscosity mPa · s | 15,000 | 18,000 | 16,000 | 23,000 | 24,000 | 29,000 | 20,000 | 25,000 |
| Coating property | ○ | ○ | ○ | ○ | ○ | ○ | ○ | ○ |
| Adherence | ○ | ○ | ⊚ | ⊚ | ⊚ | ⊚ | ⊚ | ⊚ |
| Corrosion resistance | ⊚ | ⊚ | ⊚ | ⊚ | ⊚ | ⊚ | ⊚ | ⊚ |

Remarks: Numeral in [ ] represents a solid content in wt %.

As seen from Table 4, the aqueous resin compositions (Nos. 32 to 39) according to the present invention each exhibited coating property and adherence comparable to or higher than the resin composition obtained in Comparative Example 1.

Further, the compositions according to the present invention were highly excellent in corrosion resistance as compared with the resin composition not containing any water-soluble magnesium obtained in Comparative Example 2.

The aqueous resin composition (No. 31) obtained in Example 31 was evaluated for its rust-proofing capability and corrosion resistance by being subjected to a salt spray test described below.

Example 40

A steel plate sample electroplated with zinc (the amount of zinc=40 g/m$^2$) was coated with the aqueous resin composition No. 31 to a thickness of about 1 mm. Two scratches each having a length of 60 mm were formed to intersect each other at an angle of about 50° on the coating in a central portion of the sample with a cutter knife. The sample was Example 41

Zinc-plated steel plates having three different plating film thicknesses (20, 30 and 40 g/m$^2$ on one side) were each coated with the aqueous resin composition No. 31 obtained in Example 31 or a sealing compound containing a solvent (produced by CEMEDYNE CO.) as a comparative example to a thickness of 1 mm. The steel plates thus coated were subjected to the same salt spray test as described above.

After lapse of 192 hours, even the steel plate having a plating film thickness of 40 g/m$^2$ and coated with the comparative example was observed to allow rust to be produced, whereas the steel plate having a plating film thickness as small as 30 g/m$^2$ and coated with the aqueous resin composition No. 31 of the present invention was observed to be free of rust though some white rust was observed.

It can be understood from the results of the test that use of the aqueous resin composition of the present invention makes it possible to sufficiently rust-proof a zinc-plated steel plate even if its plating film thickness is reduced.

As has been described above, an aqueous resin composition according to the present invention comprises an aqueous resin exhibiting a viscosity of 1,000 mPa·s or higher as a major component, and a viscosity modifier added to the aqueous resin to adjust the viscosity of the aqueous resin composition to a value suitable for a sealer, does not contain chlorine as a constituent element, and is of aqueous nature free of any organic solvent. The composition thus constituted is outstanding as a sealer for steel plates plated with zinc or a zinc alloy while minimizing the possibility of affecting the environment.

Further, the aqueous resin composition thus constituted is excellent in sealing properties and adherence to such an extent that coating of this composition is free from blister, crack and the like due to its water content even when instantaneously heated to a high temperature, for example, about 140° C. or higher. Such an aqueous resin composition provided by the present invention can be used as a sealer best-suited for car bodies in particular.

When a water-soluble magnesium compound is added to the foregoing aqueous resin composition, the resulting composition is imparted with a remarkable rust-proofing capability and hence is more suitable for steel plates plated with zinc or a zinc alloy.

Use of an inorganic filler as a viscosity modifier makes it possible to improve the heat resistance, durability and strength of the resulting aqueous resin composition. Alternatively, use of an organic thickening agent can avoid reaction with the aqueous resin or the water-soluble magnesium compound in viscosity adjustment thereby making it possible to prepare a stabilized aqueous resin composition. Use of a mixture of the inorganic filler and the organic thickening agent allows easy adjustment of the viscosity within any desired range, thereby making it possible to prepare the aqueous resin composition within a wider viscosity range.

According to other features of the present invention, aqueous resin compositions exhibiting very good adherence can be provided.

Where the aqueous resin composition contains the water-soluble magnesium compound, the composition exhibits a remarkable rust-proofing effect even if the amount of the magnesium compound is very small. Besides, such a rust-proofing effect can cover even a coating-free portion adjacent the border of a coating of the sealer. Thus, the aqueous composition of the present invention is capable of proofing steel plates against corrosion resulting when a portion coated with the sealer cracks due to vibration, welding or a like cause, or against corrosion from the border of the coating. Accordingly, the composition of the present invention is capable of preventing a blister or exfoliation of the sealer which is essential to the conventional sealer and hence is capable of protecting a joint portion of steel plates plated with zinc or a zinc alloy or a bent portion of such a steel plate for a long time thereby prolonging the life of such a steel plate.

Further, since the rust-proofing capability of the aqueous resin composition according to the present invention is excellent as described above, it is possible to reduce the thickness of a plating film previously formed on such a steel plate.

What is claimed is:

1. An aqueous resin composition for use as a sealer, comprising an aqueous resin as a major component, and a viscosity modifier adjusting the viscosity of the aqueous resin composition to a value ranging from 5,000 to 100,000 mPa·s, the aqueous resin being an aqueous emulsion polyolefin resin which comprises a polyolefin not containing chlorine as a constituent element while exhibiting a viscosity of 1,000 mPa·s or higher in a water-dispersed state having a solid resin content of 20% to 40% by weight.

2. The aqueous resin composition according to claim 1, further comprising a water-soluble magnesium compound in a proportion of 0.1% to 10% by weight.

3. The aqueous resin composition according to claim 1, wherein the viscosity modifier is one selected from the group consisting of an inorganic filler, an organic thickening agent, and a mixture of the inorganic filler and the organic thickening agent.

4. The aqueous resin composition according to claim 2, wherein the viscosity modifier is one selected from the group consisting of an inorganic filler, an organic thickening agent, and a mixture of the inorganic filler and the organic thickening agent.

5. The aqueous resin composition according to claim 1, wherein the aqueous resin comprises a mixture of the aqueous emulsion polyolefin resin and an aqueous adherent resin in solids content proportions of 30% to 70% by weight and 30% to 70% by weight, respectively.

6. The aqueous resin composition according to claim 2, wherein the aqueous resin comprises a mixture of the aqueous emulsion polyolefin resin and an aqueous adherent resin in solids content proportions of 30% to 70% by weight and 30% to 70% by weight, respectively.

7. The aqueous resin composition according to claim 3, wherein the aqueous resin comprises a mixture of the aqueous emulsion polyolefin resin and an aqueous adherent resin in solids content proportions of 30% to 70% by weight and 30% to 70% by weight, respectively.

8. The aqueous resin composition according to claim 4, wherein the aqueous resin comprises a mixture of the aqueous emulsion polyolefin resin and an aqueous adherent resin in solids content proportions of 30% to 70% by weight and 30% to 70% by weight, respectively.

9. The aqueous resin composition according to claim 5, wherein the aqueous adherent resin is an aqueous urethane resin.

10. The aqueous resin composition according to claim 6, wherein the aqueous adherent resin is an aqueous urethane resin.

11. The aqueous resin composition according to claim 7, wherein the aqueous adherent resin is an aqueous urethane resin.

12. The aqueous resin composition according to claim 8, wherein the aqueous adherent resin is an aqueous urethane resin.

13. The aqueous resin composition according to claim 5, wherein the aqueous adherent resin is an aqueous epoxy resin.

14. The aqueous resin composition according to claim 6, wherein the aqueous adherent resin is an aqueous epoxy resin.

15. The aqueous resin composition according to claim 7, wherein the aqueous adherent resin is an aqueous epoxy resin.

16. The aqueous resin composition according to claim 8, wherein the aqueous adherent resin is an aqueous epoxy resin.

17. The aqueous resin composition according to claim 5, wherein the aqueous adherent resin is a mixture of an aqueous urethane resin and an aqueous epoxy resin at a solids content weight ratio ranging between 1:4 and 4:1.

18. The aqueous resin composition according to claim 6, wherein the aqueous adherent resin is a mixture of an aqueous urethane resin and an aqueous epoxy resin at a solids content weight ratio ranging between 1:4 and 4:1.

19. The aqueous resin composition according to claim 7, wherein the aqueous adherent resin is a mixture of an aqueous urethane resin and an aqueous epoxy resin at a solids content weight ratio ranging between 1:4 and 4:1.

20. The aqueous resin composition according to claim 8, wherein the aqueous adherent resin is a mixture of an aqueous urethane resin and an aqueous epoxy resin at a solids content weight ratio ranging between 1:4 and 4:1.

* * * * *